US011233758B2

(12) United States Patent
Golbandi et al.

(10) Patent No.: US 11,233,758 B2
(45) Date of Patent: Jan. 25, 2022

(54) SELECTIVE SCREEN SHARING (71) Applicant: VERIZON PATENT AND LICENSING INC., Basking Ridge, NJ (US)

(72) Inventors: Nadav Golbandi, Sunnyvale, CA (US); Oren Shlomo Somekh, Haifa (IL); Rodrigo Setti, San Jose, CA (US); Srinivas Raovasudeva, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 14/949,024

(22) Filed: Nov. 23, 2015

(65) Prior Publication Data
US 2017/0149710 A1    May 25, 2017

(51) Int. Cl.
*G06F 15/16* (2006.01)
*H04L 12/58* (2006.01)
*H04W 12/02* (2009.01)
*H04W 12/037* (2021.01)
*H04W 12/084* (2021.01)

(52) U.S. Cl.
CPC ............. *H04L 51/10* (2013.01); *H04L 51/12* (2013.01); *H04L 51/14* (2013.01); *H04W 12/02* (2013.01); *H04W 12/037* (2021.01); *H04W 12/084* (2021.01)

(58) Field of Classification Search
CPC ................................ H04L 51/10; H04L 51/12
USPC .................................................. 709/205, 204
See application file for complete search history.

(56) References Cited

U.S. PATENT DOCUMENTS

| 7,043,048 | B1 * | 5/2006 | Ellingson ........... H04N 1/32101 382/100 |
| 7,046,134 | B2 | 5/2006 | Hansen |
| 7,562,397 | B1 * | 7/2009 | Mithal .................... H04L 63/06 726/33 |
| 8,224,970 | B2 | 7/2012 | Nishiyama |
| 8,466,954 | B2 | 6/2013 | Ko et al. |
| 8,823,602 | B2 | 9/2014 | Yada |
| 8,904,294 | B2 * | 12/2014 | Dinka ................. H04L 65/4023 715/753 |
| 9,098,230 | B2 | 8/2015 | Masuda et al. |
| 9,105,088 | B1 * | 8/2015 | Petrie ...................... G06T 5/004 |
| 9,131,021 | B2 | 9/2015 | Bhogal et al. |
| 9,141,332 | B2 | 9/2015 | Coleman et al. |
| 2007/0179897 | A1 * | 8/2007 | Andersson .............. H04L 63/10 705/59 |

(Continued)

FOREIGN PATENT DOCUMENTS

WO    WO-0141018 A2 * 6/2001 ............. G06Q 30/06

*Primary Examiner* — Hee Soo Kim (57) ABSTRACT

Method, systems, and computer-readable for selectively sharing media among two or more client devices. Initially, media (e.g., image(s), video, audio, text, etc.) can be rendered via a first client device. Portions of the media rendered on a first client device can be selectively encoded, thereby masking the selectively encoded portions. The media can then be shared, including the encoded portions, with a second client device. Using the first client device, an operation can be implemented for authorizing decoding of the portions of the media by the second client device, thereby allowing the decoded portions of the media to be rendered by the second client device without masking.

20 Claims, 4 Drawing Sheets

(56) References Cited

U.S. PATENT DOCUMENTS

| | | | |
|---|---|---|---|
| 2009/0307078 A1* | 12/2009 | Mithal | H04L 12/14 |
| | | | 705/14.35 |
| 2012/0011451 A1* | 1/2012 | Bansal | H04N 7/15 |
| | | | 715/753 |
| 2013/0076764 A1 | 3/2013 | Yada | |
| 2013/0290863 A1* | 10/2013 | Chen | G06F 3/0481 |
| | | | 715/747 |
| 2014/0143440 A1* | 5/2014 | Ramamurthy | H04L 65/60 |
| | | | 709/231 |
| 2014/0215356 A1 | 7/2014 | Brander et al. | |
| 2015/0007351 A1* | 1/2015 | Janajri | H04L 51/00 |
| | | | 726/30 |
| 2015/0061970 A1* | 3/2015 | Kim | G06F 3/1423 |
| | | | 345/2.3 |
| 2015/0186101 A1 | 7/2015 | Zhang et al. | |
| 2015/0201193 A1 | 7/2015 | Gu et al. | |
| 2015/0201199 A1* | 7/2015 | Gu | H04N 19/127 |
| | | | 375/240.02 |
| 2015/0237084 A1 | 8/2015 | Duong et al. | |
| 2015/0278534 A1* | 10/2015 | Thiyagarajan | G06F 21/84 |
| | | | 726/28 |
| 2015/0293742 A1 | 10/2015 | Masuda et al. | |

\* cited by examiner

SELECTIVE SCREEN SHARING

BACKGROUND

Users of computing devices such as laptop computers, tablet computers, and smartphones often encounter the situation in which they would like to selectively share media information with surrounding colleagues, friends, and/or family members. Such information may be, for example, a few photos that were taken during a vacation and loaded onto a user's social media page, or a funny text message that the user received via a messaging application and would like to share with others. This information currently can be shared utilizing, for example, a smartphone, a tablet, or desktop display screen by simply showing the display screen to someone. For example, a user may ask a colleague to step closer to a display screen where the desired information is rendered.

In each case, the user's objective is to share particular pieces of information with specific individuals. A problem arises, however, because many of the platforms involved in sharing media contain information that the user may wish to remain private. For example, a user may only want to share a few pictures, but not other information such as other photos and text displayed on the same page. A user may wish to share vacation photos in a "Whatsapp" application, for example, on a smartphone screen with other colleagues during lunch, but may not want his or her colleagues to be able to also read the private text messages that may appear along with those pictures. One can overcome these privacy issues utilizing various pre-emptive yet tedious actions such as enlarging the selected pictures one at a time before showing them to avoid rendering the private content, which is tedious and time consuming.

BRIEF SUMMARY

Some embodiments provide for the selective sharing of media and information by users among themselves utilizing their computing devices (e.g., smartphone, tablet computer, laptop computer, desktop computer, etc.).

In some embodiments, a method for selectively sharing media among two or more client devices can include steps or operations for rendering media (e.g., information, text, video, images, audio, etc.) on a first client device, and selectively encoding portions of the media rendered on a first client device, thereby masking the selectively encoded portions. Additional steps or operations can include sharing the media, including the encoded portions, with a second client device; and using the first client device, authorizing decoding of the portions of the media by the second client device, thereby allowing the decoded portions of the media to be rendered by the second client device without masking.

Various embodiments may be implemented via a device or system comprising a processor and a memory. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures, which illustrate by way of example the principles of the disclosed embodiments.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
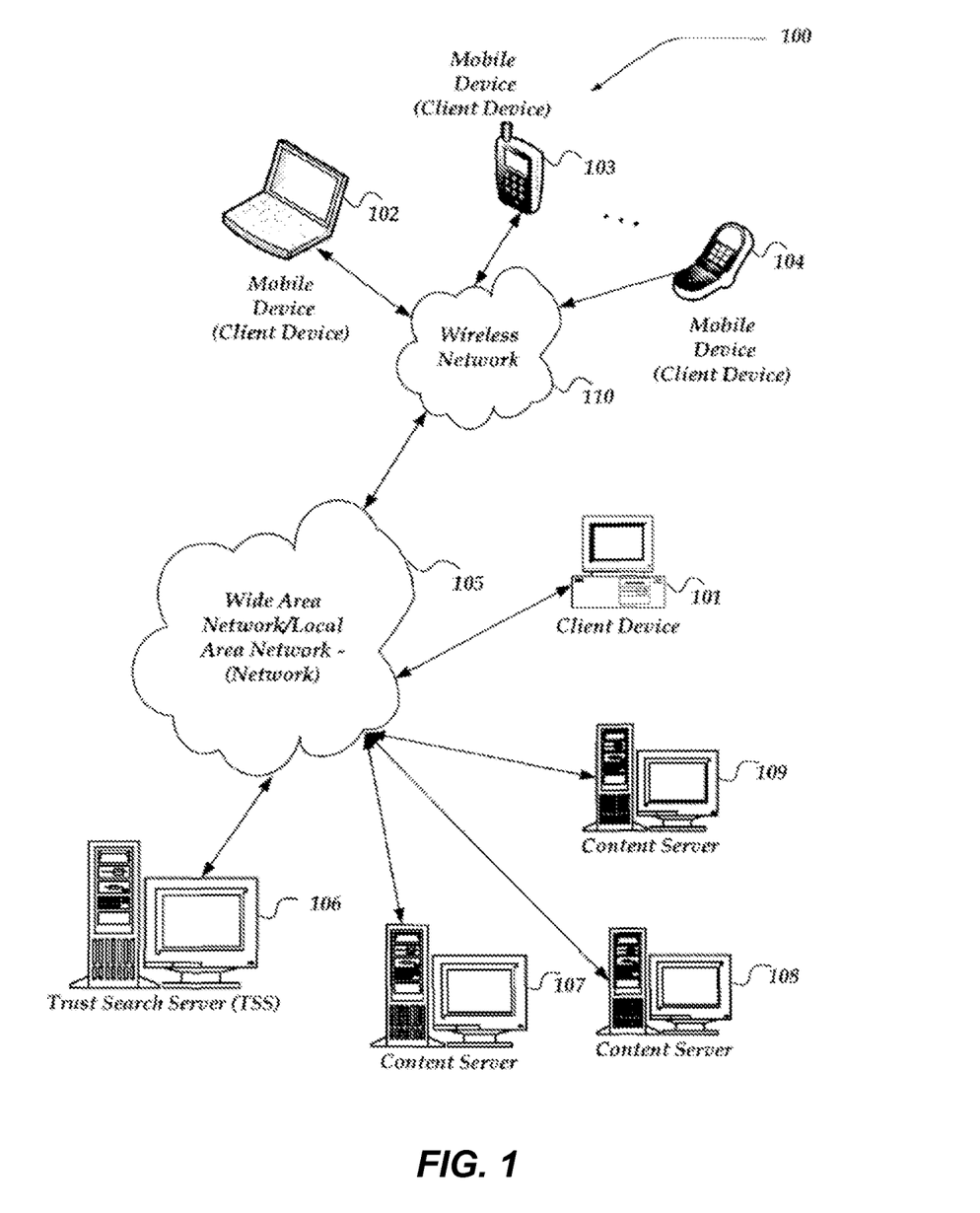
FIG. 1 illustrates a schematic diagram of an example embodiment of an environment in which a system for selective screen sharing may operate.

FIG. 1 illustrates a schematic diagram depicting an example embodiment of a system 100 composed of one or more networks. Other embodiments that may vary, for example, in terms of arrangement or in terms of type of components, are also intended to be included within the claimed subject matter. The system 100 depicted in FIG. 1, for example, includes a variety of networks, such as a WAN (Wide Area Network)/LAN (Local Area Network) 105, a wireless network 110, and a variety of devices, such as a client device 101, mobile devices 102, 103, 104, and a variety of servers, such as content servers 107, 108, 109 and a trust search server 106. In the example configuration depicted in FIG. 1, mobile devices 102, 103, and 104 are client devices that communicate wirelessly with system 100 through the wireless network 110. The WAN/LAN network 105 also communicates with the wireless network 110.

A content server such as content servers 107, 108, 109 may include a device that includes a configuration to provide content via a network to another device. A content server may, for example, host a site, such as a social networking site, examples of which may include, without limitation, Flicker®, Twitter®, Facebook®, LinkedIn®, or a personal user site (e.g., such as a blog, vlog, online dating site, etc.). A content server may also host a variety of other sites including, but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type, or programmable consumer electronics, etc.

A network such as network 105 and/or network 110 depicted in FIG. 1 can couple devices so that communications may be exchanged, such as between a server and a client device or other types of devices, including between wireless devices coupled via a wired or wireless network, for example. A network may also include mass storage, such as network-attached storage (NAS), a storage area network (SAN), or other forms of computer or machine-readable media, for example. A network may include the Internet, one or more local area networks (LANs), one or more wide area networks (WANs), wire-line type connections, wireless type connections, or any combination thereof. Likewise, sub-networks may employ differing architectures or may be compliant or compatible with differing protocols, and may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network such as the wireless network 110 depicted in FIG. 1 may couple client devices with the network. That is, such a wireless network may employ stand-alone ad-hoc networks, mesh networks, wireless LAN (WLAN) networks, cellular networks, or the like. A wireless network such as wireless network 110 can further include a system of terminals, gateways, routers, or the like coupled by wireless radio links, or the like, which may move freely, randomly, or organize themselves arbitrarily, such that network topology may change, at times even rapidly. A wireless network may further employ a plurality of network access technologies including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks (e.g., networks 105, 110) may be compatible with or compliant with one or more protocols. The signaling formats or protocols employed may include, for example, TCP/IP, UDP, DECnet, NetBEUI, IPX, AppleTalk, or the like. Versions of the Internet Protocol (IP) may include IPv4 or IPv6.

The Internet refers to a decentralized global network of networks. The internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the internet from a user site via an access node coupled to the internet. Likewise, a signal packet may be forwarded via network nodes to a target site coupled to the network via a network access node, for example. A signal packet communicated via the internet may, for example, be routed via a path of gateways, servers, etc., that may route the signal packet in accordance with a target address and availability of a network path to the target address.

Figure 2:
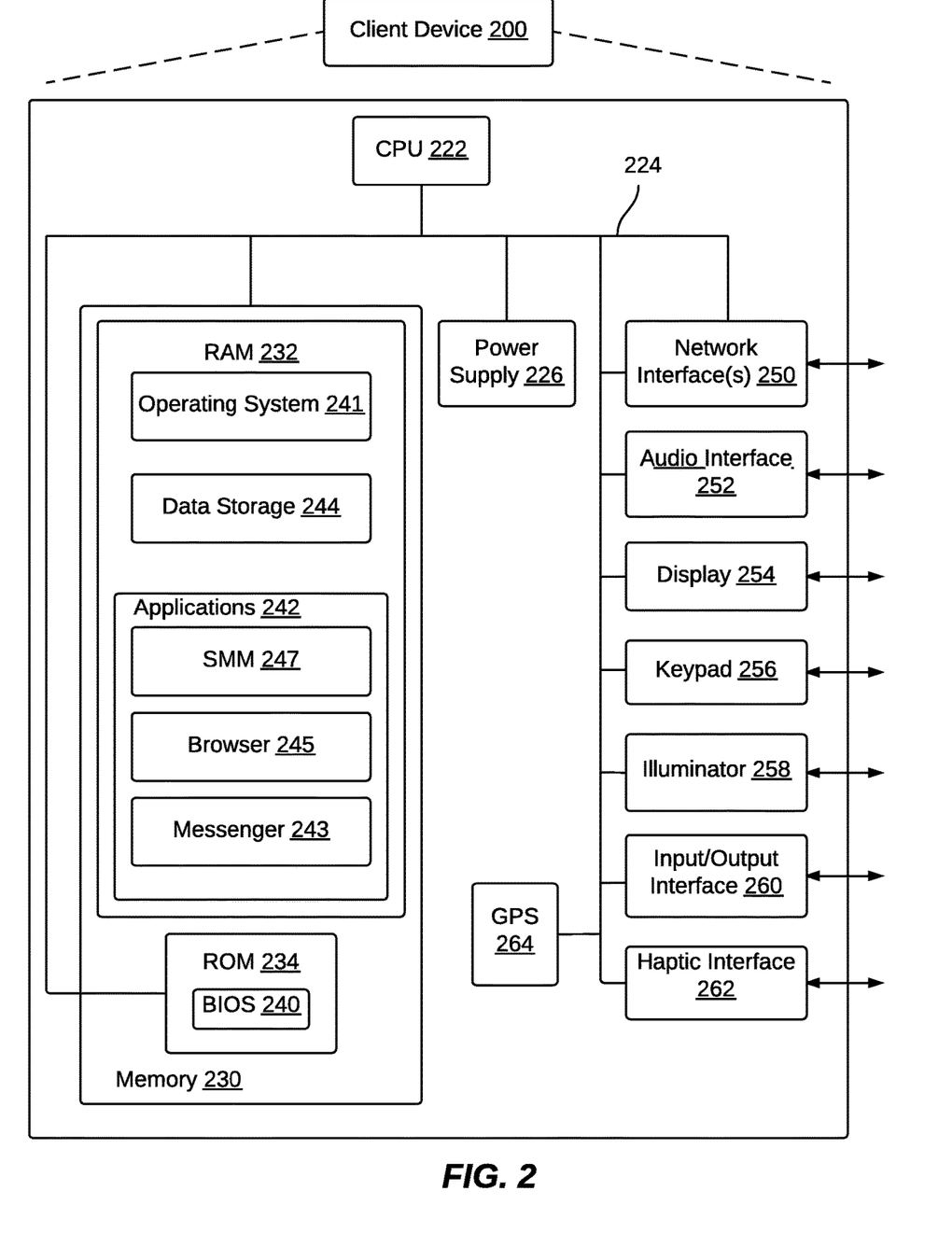
FIG. 2 illustrates a schematic diagram depicting an example embodiment of a client device for providing a selective screen sharing application.

FIG. 2 illustrates a schematic diagram depicting one example embodiment of a client device 200 that may be used as, for example, one or more of the client devices 101, 102, 103, and 104 depicted in FIG. 1. The client device 200 can function as a computing device capable of sending or receiving signals through a wired or a wireless network such as, for example, networks 105, 110 depicted in FIG. 1.

The client device 200 may implemented as, for example, a desktop computer or a portable device, such as a cellular telephone, a Smartphone, a display pager, a radio frequency (RF) device, an infrared (IR) device, a Personal Digital Assistant (PDA), a handheld computer, a tablet computer, a laptop computer, a desktop computer, a set top box, a wearable computer, or an integrated device combining various features, such as features of the foregoing devices, or the like.

A client device such as client device 200 may vary in terms of capabilities or features. The claimed subject matter is intended to cover a wide range of potential variations. For example, a cell phone may include a numeric keypad or a display of limited functionality, such as a monochrome liquid crystal display (LCD) for rendering text and other media. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device such as client device 200 may include or may execute a variety of operating systems, such as operating system 241, including in some example embodiments a personal computer operating system, such as a Windows, iOS, or Linux, or a mobile operating system, such as iOS, Android, or Windows Mobile, or the like. A client device such as client device 200 may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, and Google+® to provide only a few possible examples.

A client device, such as client device 200, may also include or execute an application to communicate content, such as, for example, textual content, multimedia content, or the like. A client device may also include or execute an application to perform a variety of possible tasks, such as browsing, searching, playing various forms of content, including locally stored or streamed video, or games (e.g., fantasy sports leagues, etc.). The foregoing is provided to illustrate that claimed subject matter is intended to include a wide range of possible features or capabilities. Examples of such applications (or modules) can include a messenger 243, a browser 245, and other client application(s) or module(s) such as a selective media-masking (SMM) module 247, which can implement instructions or operations such as those described herein with respect to FIGS. 3-5.

The example client device 200 shown in FIG. 2 generally includes a CPU (Central Processing Unit) 222 and/or other processors (not shown) coupled electronically via a system bus 224 to memory 230, power supply 226, and a network interface 250. The memory 230 can be composed of RAM (Random Access Memory) 232 and ROM (Read Only Memory) 234. Other example components that may be included with client device 200 can include, for example, an audio interface 252, a display 254, a keypad 256, an illuminator 258, and an input/output interface 260. In some example embodiments, a haptic interface 262 and a GPS (Global Positioning Satellite) unit 264 can also be electronically coupled via the system bus 224 to CPU 222, memory 230, power supply 226, and so on.

RAM 232 can store an operating system 241 and provide for data storage 244, and the storage of applications 242 such as, for example, browser 245 and messenger 243 applications. ROM 234 can include a BIOS (Basic Input/Output System) 240, which is a program that the CPU 222 utilizes to initiate the computing system associated with client device 200. BIOS 240 can also manage data flow between operating system 241 and components such as display 254, keypad 256, and so on.

Applications 242 can thus be stored in memory 230 and may be "loaded" (i.e., transferred from, for example, memory 230 or another memory location) for execution by the client device 200. Client device 200 can receive user commands and data through, for example, the input/output interface 260. Such inputs may then be acted upon by the client device 200 in accordance with instructions from operating system 241 and/or application(s) 242. The interface 260, in some embodiments, can serve to display results, whereupon a user may supply additional inputs or terminate a session.

The following discussion is intended to provide a brief, general description of suitable computing environments in which the disclosed methods and systems may be implemented. Although not required, the disclosed embodiments will be described in the general context of computer-executable instructions, such as program modules being executed by a single computer. In most instances, a "module" constitutes a software application. However, a module may also comprise, for example, electronic and/or computer hardware or such hardware in combination with software. In some cases, a "module" can also constitute a database and/or electronic hardware and software that interact with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term "module" as utilized herein may refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIGS. 3, 4, and 5 and discussed elsewhere herein can be implemented in some example embodiments in the context of such a module or a group of modules, sub-modules, and so on. For example, in some embodiments, the applications 242 illustrated in FIG. 2 in the context of client device 200 can function as a module composed of a group of sub-modules such as, for example, SMM 247, browser 245, messenger 243, and so on.

Figure 3:
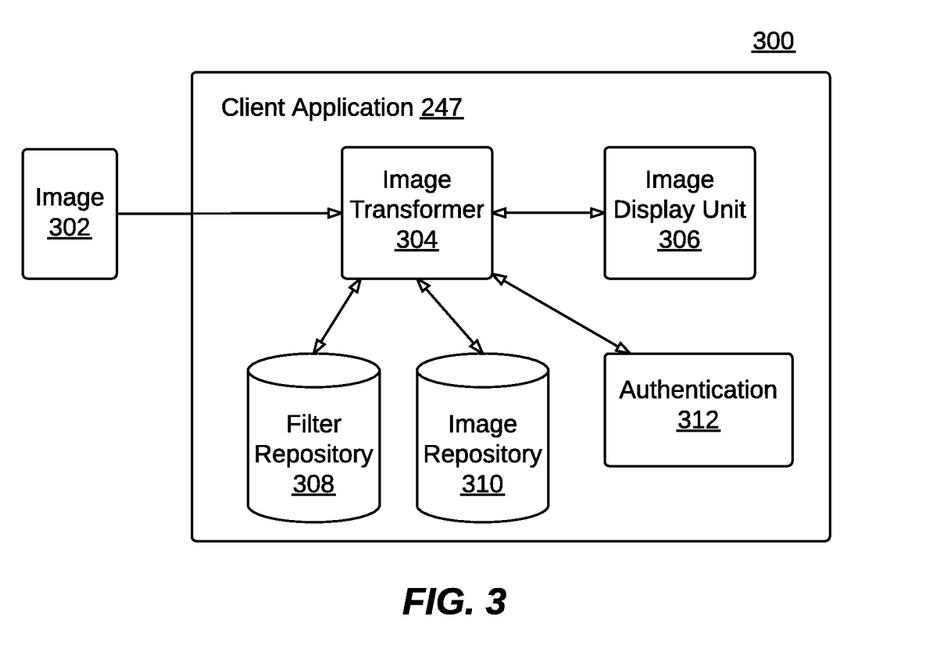
FIG. 3 illustrates a block diagram of a system for selective screen sharing in accordance with an example embodiment.

FIG. 3 illustrates a block diagram of a system 300 for selective screen sharing in accordance with an example embodiment. The system 300 can include features embodied in a selective media-masking (SMM) module 247 as described herein with respect to FIG. 2. The example depicted in FIG. 3 illustrates the case where an image can be shared between one client device and another client device, but the image is masked (e.g., blurred) when displayed on the other client device (i.e., second, third, fourth client devices, etc.). System 300 can include, for example, the SMM module 247 as a client application, which, as shown in FIG. 2, may constitute one or more applications 242 such as SMM module 247, browser 245, messenger 243, and so on. In some example embodiments, the SMM module 247 can include an image transformer 304 and an image display unit or module 306. As shown in FIG. 3, an image 302 can be provided as input to image transformer 304, which in turn provides a transformed image to the image display module 306. The image transformer can communicate bi-directionally with a filter repository 308, an image repository 310, and an authentication module 312.

The filter repository 308 can contain one or more filters which can be used to transform the image 302 via the image transformer 304. For example, the filter repository 308 may contain a blurring filter that is accessible by the image transformer 304 to transform (in this case, blur) some or all of the image 302. The resulting blurred image is then displayable via the image display unit 306. The authentication module 312 (e.g., a fingerprint authentication module) can be utilized to authenticate any encoding/decoding or transforming operations performed by the image transformer 304 with respect to image 302.

System 300 offers a functionality that can be easily added to applications or software used in presenting or browsing through media items and media content (e.g., text messages, links, audio files, images, videos, and other such content). Such functionality allows a user to selectively reveal or mask specific items or content, such as image 302 appearing on the client device's display.

For example, masking a specific image can be accomplished by implementing a masking function (e.g., Gaussian blur, Gaussian smoothing, or another image noise reduction technique) via the image transformer 304 so that the resulting image or parts of the image to be displayed by the image display unit 306 is unrecognizable while preserving its original size and color distribution. To revert the image 302 back to its original form, the authentication module 312 (e.g., fingerprint recognition) may be utilized. The same principle may be applied to other media types (such as shown in FIG. 4).

The client application/SMM module 247 can operate in two modes: (a) masking specific media items while maintaining all others untouched for all to see; or (b) leaving specific media items untouched for all to see while masking all others.

Figure 4:
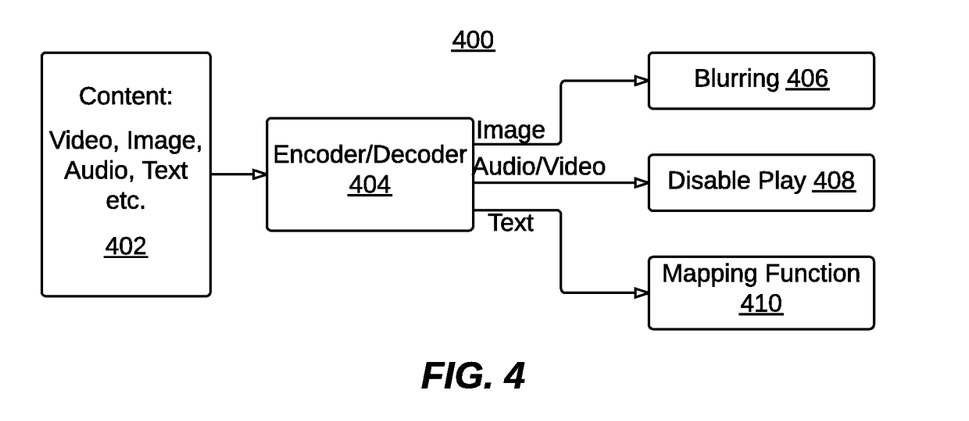
FIG. 4 illustrates a flow diagram depicting operations of a method for selective screen sharing in accordance with an example embodiment.

FIG. 4 illustrates a flow diagram depicting operations of a method 400 for selective screen sharing in accordance with an example embodiment. The method 400 depicted in FIG. 4 addresses situations where a user wants to share his or her device's display showing a collection of media items originated from storage, search, communication, or browsing while being able to selectively mask some of the items for privacy purposes. This masking mechanism can keep the overall structure, size, and form of the user-interface by implementing the masking mechanism in a non-intrusive manner.

As shown at block 402, a variety of content types (e.g., video, image, audio, text, etc.) may be subject to screen sharing and masking. At the application level, an encoder/decoder 404 can be implemented for each content type. For images, a convolution kernel such as a Gaussian blur can be implemented via a blurring module 406. The image can be encoded on the client device. A user interface can be employed to revert the encoding by a simple authentication. The authentication module 312 depicted in FIG. 3 can facilitate such authentication. For audio and/or video, a disable play operation 408 can be implemented. That is, a "Play" button, or other such implementation used to initiate audio or video playback can be disabled. Blurring may be simultaneously or independently applied to, for example, a static image. For text, a simple mapping function 410 can be used (e.g., text can be replaced by same-sized Latin words, so that the structure is kept but the meaning is lost).

The method 400 shown in FIG. 4 can be implemented in the context of a user interface. For example, a new widget pop-up can be employed once a user "clicks" on a masked item so that the user can swipe a specific unlock pattern, input a password based identifier, or initiate fingerprint authentication.

Figure 5:
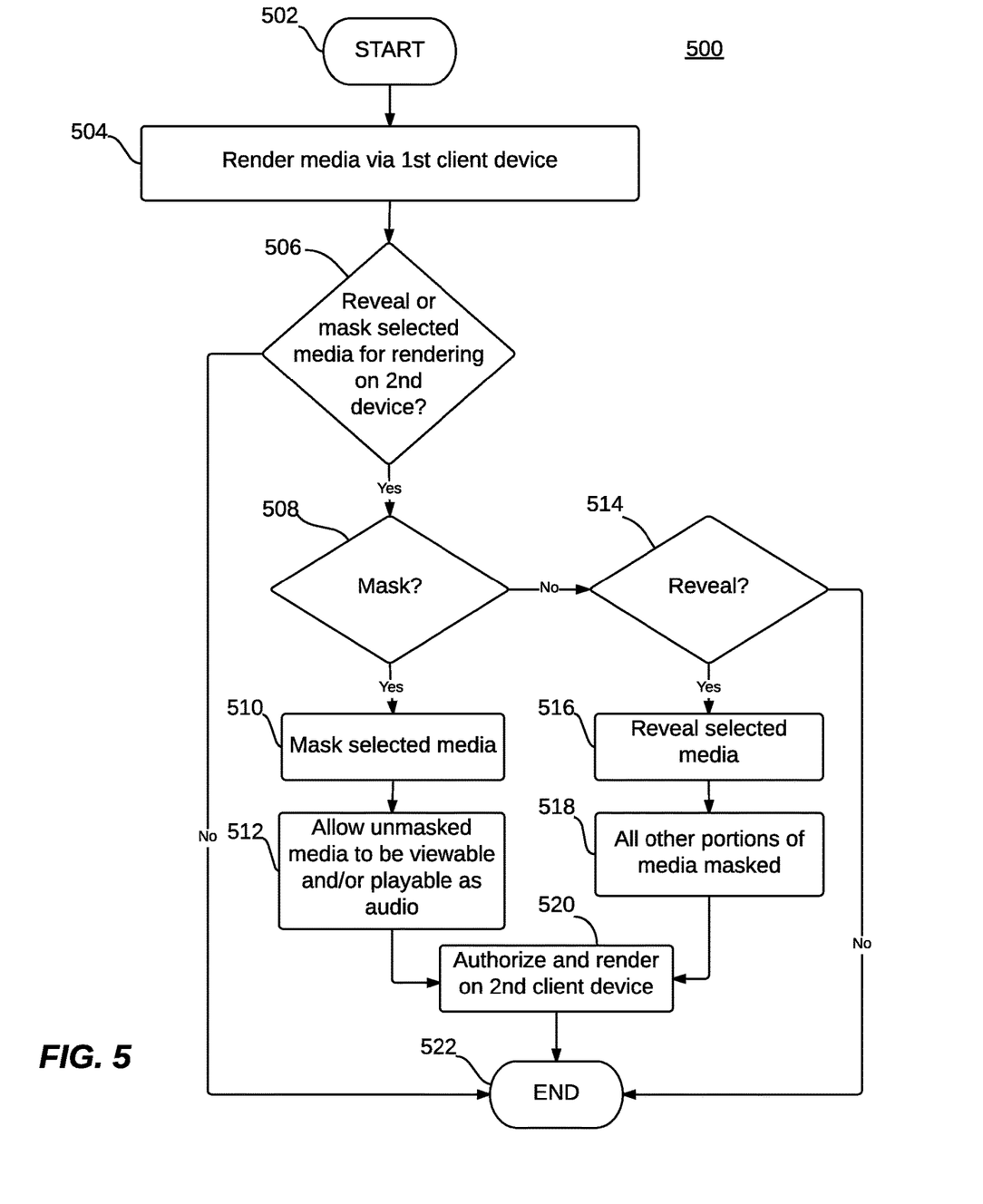
FIG. 5 illustrates a high-level flow chart of operations depicting logical operational steps of a method for selective screen sharing, in accordance with an example embodiment.

FIG. 5 illustrates a high-level flow chart of operations depicting logical operational steps of a method 500 for selective screen sharing, in accordance with an example embodiment. The process depicted in FIG. 5 can be initiated as indicated at block 502. As shown next at block 504, media (e.g., image(s), video, audio, text, etc.) is rendered (e.g., text, images or video displayed, audio played, etc.) via a first client device, which may be, for example, the client device 102 depicted in FIG. 1. The user of the first client device can selectively reveal or mask all or portions of such media rendered on the first client device for rendering on a second client device such as, for example, one or more of the client devices 101, 102, 103, and/or 104 also shown in FIG. 1. Note that as utilized herein, the term "second client device" can refer not only to the case of a single second client device, but can also cover the case of multiple client devices (i.e., second, third, and fourth client devices, etc.). As indicated at decision block 506, a test or operation can be implemented to determine whether or not to render (reveal or mask) selected media displayed on the first client device via a second client device (i.e., one or more of the other client devices).

Assuming the answer in response to the determination made as a result of the operation depicted at decision block 506 is "Yes," an operation can be implemented, as depicted at block 508, to determine whether or not to mask the selected media (i.e., the media displayed on the first client device) so that such media is blurred or hidden when rendered on the second client device.

If the answer is "Yes," then the operations depicted at blocks 510 and 512 are implemented. That is, as illustrated at block 510, the selected media is masked. Additionally (and this may also be presented as an option), the unmasked media also displayed on the first client device can be selected to be viewable on the second client device. That is, portions of the selected media can be masked for rendering (e.g., the display of images, text, and/or video, playing of audio media, etc.) on the second client device while allowing for other portions of the media to be available for viewing (or listening, in the case of audio media) via the second client device. An authorization and rendering operation can then be implemented as shown at block 520 to permit such masked media (and optionally unmasked media) to be viewable and/or heard by a listener via the second client device. The process can then terminate, as shown at block 522.

Now, assuming that the answer with respect to the operation depicted at decision block 508 is "No," then an operation can be implemented, as indicated at decision block 514, to determine whether or not to reveal any information from the first client device for rendering on the second client device. If so, then the operations depicted at block 516 and 518 can be implemented. That is, as indicated at block 516, selected media rendering on the first client device can be revealed (e.g., images or video displayed and/or audio played) on the second client device. Optionally, as indicated at block 518, portions of the media can be left unmasked for viewing and/or listening on the second client device, while masking all other portions of the media. The media can then be authorized and rendered on the second client device, as indicated at block 520. The process can then end as shown at block 522.

Based on the foregoing, it can be appreciated that a number of varying embodiments are disclosed herein. For example, in an embodiment, a method for selectively sharing media (e.g., image 302 or content 402) among two or more client devices can be implemented. Such a method can include steps or operations for rendering media on a first client device; selectively encoding portions of the media rendered on the first client device, thereby masking the selectively encoded portions; sharing the media, including the encoded portions, with a second client device; and using the first client device, authorizing decoding of the portions of the media by the second client device, thereby allowing the decoded portions of the media to be rendered by the second client device without masking.

Note that the term rendering as utilized herein can include not only displaying media (e.g., images, video, etc.), but also playing media such as audio via a speaker associated or integrated with a client device. Rendering may involve a display or playing of such media via the first client device and/or the other client devices.

In another example embodiment, a step or operation can be provided for allowing the decoded portions of the media to be rendered on a display of the second client device. In yet another embodiment, a step or operation can be provided for allowing (or authorizing) the decoded portions of the media to be rendered by a speaker of the second client device. In some example embodiments, encoding can be carried out at an application layer on the first client device and the authorized decoding by the second client device can be allowed to be carried out at an application layer of the second client device.

In still another example embodiment, the step or operation of masking portions of the media can further include steps or operations for rendering the portions of the media unrecognizable while preserving an original size and an original color distribution associated with the portions of the media, or rendering the portions of the media unrecognizable while preserving an original length of time and an original pitch distribution associated with the portions of the media. Masking portions of the media can involve blurring (e.g., as facilitated via the blurring module 406 shown in FIG. 4) or scrambling the portions of the media. Authorizing can occur after receiving a request from the second client device. Such authorization steps or operations can be facilitated by, for example, the authentication module 312 shown in FIG. 3.

In yet another example embodiment, a client device can be provided for selectively sharing media. Such a client device can include, for example, one or more processors and a memory comprising program logic configured for: rendering and selectively encoding media; selectively encoding portions of the media, thereby masking the selectively encoded portions; sharing the media, including the selectively encoded portions with a second client device; and authorizing the second client device to decode the selectively encoded portions media, thereby allowing the second client device to render the selectively encoded media without masking.

In some client device embodiments, the processor(s) or the memory can be further configured for allowing decoded portions of the media to be rendered on a display of the second client device. In another client device embodiment, the processor(s) or the memory can be further configured for allowing decoded portions of the media to be rendered by a speaker of the second client device. In yet another client device embodiment, the authorized decoding by the second client device is allowed to be carried out at an application layer of the second client device.

In yet another client device embodiment, masking portions of the media further can further involve rendering the portions of the media unrecognizable while preserving an original size and an original color distribution associated with the portions of the media, or rendering the portions of the media unrecognizable while preserving an original length of time and an original pitch distribution associated with the portions of the media.

In another client device embodiment, masking portions of the media can include blurring or scrambling (e.g., facilitated by the blurring module 406 shown in FIG. 4) the portions of the media. Authorization may occur after receiving a request from the second client device.

In some client device embodiments, the processor(s) or the memory can be further configured for performing operations including accepting user-generated input and performing the encoding using the user-generated input.

In another example embodiment, a non-transitory computer-readable storage medium for selectively sharing media from a first client device to a second client device can be implemented. Such a computer-readable storage medium can include, for example, instructions for rendering and selectively encoding media; instructions for masking selectively encoded portions of the media; instructions for sharing the media, including the selectively encoded portions, from the first client device to the second client device; and instructions for authorizing the second client device to decode of the selectively encoded portions of the media, thereby allowing the second client device to render the selectively encoded portions of the media without masking.

The decoded portions of the media can be rendered by a display, a speaker, or a display and speaker of the second client device. Such instructions can be performed at an application layer. In some embodiments, the aforementioned instructions authorizing can be performed by the first client device after receiving a request from the second client device.

In yet another example embodiment, the computer-readable storage medium can include instructions for rendering the portions of the media unrecognizable while preserving an original size and an original color distribution associated with the portions of the media; or instructions for rendering the portions of the media unrecognizable while preserving an original length of time and an original pitch distribution associated with the portions of the media.

It can be appreciated that the example embodiments illustrated in FIGS. 1-5 serve only as examples to illustrate several ways of implementation of the present disclosure. Such example embodiments should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A method for selectively sharing media among two or more client devices, said method comprising:

rendering media on a first client device;

responsive to authenticating one or more encoding operations associated with said media via a first authentication input, comprising a fingerprint, received via a user interface, selectively encoding, at a first application layer on said first client device, portions of said media rendered on said first client device to mask said selectively encoded portions via a communication application configured to communicate one or more messages comprising at least one of an email message, a short message service (SMS) message or a multimedia message service (MMS) message, wherein said selectively encoded portions are determined based upon a designation of a first portion of said media to remain unmasked, and wherein said masking comprises:

masking a second portion, comprising at least one of video or audio, of said media by:
disabling a mechanism, in said second portion of said media, configured to initiate at least one of audio playback or video playback;

masking a third portion, comprising an image, of said media by:
rendering said third portion of said media unrecognizable while preserving an original size and an original color distribution associated with said third portion of said media; and masking a fourth portion, comprising text, of said media by:
rendering text of said media unrecognizable while preserving an original size associated with said text of said media by replacing said text with same-sized words;

sharing said media, including said selectively encoded portions and said first portion, via said communication application on said first client device with a second instance of said communication application on a second client device, wherein said second instance of said communication application on said second client device is configured to communicate one or more messages comprising at least one of an email message, an SMS message or an MMS message;

receiving, at said first client device with said communication application from which said media was shared and from said second client device with said second instance of said communication application to which said media was shared, a request for authorization for said second instance of said communication application on said second client device to decode said selectively encoded portions of said media; and responsive to receiving said request, transmitting, from said first client device to said second instance of said communication application on said second client device, instructions authorizing decoding, at a second application layer on said second client device, of said selectively encoded portions of said media by said second client device into decoded portions of said media configured to be rendered by said second instance of said communication application on said second client device without masking, said decoding based upon a second authentication associated with a second authentication input received via a second user interface, wherein said second authentication input comprises said fingerprint.

2. The method of claim 1 comprising allowing said decoded portions of said media to be rendered on a display of said second client device.

3. The method of claim 1 comprising allowing said decoded portions of said media to be rendered by a speaker of said second client device.

4. The method of claim 1 wherein said communication application is configured to communicate one or more email messages.

5. The method of claim 1 wherein said communication application is configured to communicate one or more SMS messages.

6. The method of claim 1 wherein said masking said third portion of said media comprises blurring or scrambling said third portion of said media.

7. The method of claim 1 wherein said communication application is configured to communicate one or more MMS messages.

8. A client device for selectively sharing media, said client device comprising:

at least one processor; and a memory comprising program logic configured for:

rendering media;

responsive to authenticating one or more encoding operations associated with said media via a first authentication input, comprising a fingerprint, received via a user interface, selectively encoding, at a first application layer on said client device, portions of said media to mask said selectively encoded portions, wherein said selectively encoded portions are determined based upon a designation of a first portion of said media to remain unmasked, wherein said masking comprises (i) disabling a mechanism, in said media, configured to initiate at least one of audio playback or video playback and (ii) rendering a second portion of said media unrecognizable while preserving an original size and an original color distribution associated with said second portion of said media;

sharing said media, including said selectively encoded portions and said first portion, with a second client device;

receiving, at said client device from said second client device, a request for authorization for said second client device to decode said selectively encoded portions of said media; and responsive to receiving said request for authorization to decode said selectively encoded portions of said media, authorizing said second client device to decode, at a second application layer on said second client device, said selectively encoded portions of said media, said decoding based upon an authentication associated with a second authentication input received via a second user interface, wherein said second authentication input comprises said fingerprint.

9. The client device of claim 8 wherein said at least one processor or said memory is configured for allowing decoded portions of said media to be rendered on a display of said second client device.

10. The client device of claim 8 wherein said at least one processor or said memory is configured for allowing decoded portions of said media to be rendered by a speaker of said second client device.

11. The client device of claim 8 wherein said authorized decoding by said second client device is allowed to be carried out at an application layer of said second client device.

12. The client device of claim 8 wherein said second user interface is of said second client device.

13. The client device of claim 8 wherein said masking said selectively encoded portions of said media comprises blurring or scrambling at least some of said selectively encoded portions of said media.

14. The client device of claim 8 wherein said authorizing occurs after receiving a request from said second client device.

15. The client device of claim 8 wherein said at least one processor or said memory is configured for performing operations comprising:
   accepting user-generated input; and
   performing said encoding using said user-generated input.

16. A non-transitory computer-readable storage medium comprising instructions which when executed perform a method for selectively sharing media from a first client device to a second client device, comprising:
   rendering media;
   responsive to authenticating one or more encoding operations associated with said media via a first authentication input, comprising a fingerprint, received via a user interface, masking, at a first application layer on said first client device, selectively encoded portions of said media via a communication application, wherein said masking comprises (i) disabling a mechanism, in said media, configured to initiate at least one of audio playback or video playback and (ii) rendering text of said media unrecognizable while preserving an original size associated with said text of said media by replacing said text with same-sized words;
   sharing said media, including said selectively encoded portions, from said first client device via said communication application on said first client device with a second instance of said communication application on said second client device;
   receiving, at said first client device with said communication application from which said media was shared and from said second client device with said second instance of said communication application to which said media was shared, a request for authorization for said second instance of said communication application on said second client device to decode said selectively encoded portions of said media; and
   responsive to receiving said request, authorizing said second instance of said communication application on said second client device to decode, at a second application layer on said second client device, said selectively encoded portions of said media, said decoding based upon a second authentication associated with a second authentication input received via a second user interface, wherein said second authentication input comprises said fingerprint.

17. The non-transitory computer-readable storage medium of claim 16 wherein decoded portions of said media are capable of being rendered by said second instance of said communication application via a display of said second client device.

18. The non-transitory computer-readable storage medium of claim 16 wherein decoded portions of said media are capable of being rendered by said second instance of said communication application via a speaker of said second client device.

19. The non-transitory computer-readable storage medium of claim 16 wherein decoded portions of said media are capable of being rendered by said second instance of said communication application via a display and speaker of said second client device.

20. The non-transitory computer-readable storage medium of claim 16 wherein said masking comprises blurring or scrambling one or more portions of said media.

\* \* \* \* \*